United States Patent Office 3,630,984
Patented Dec. 28, 1971

1

3,630,984
LATEXES OF VINYL CYCLOHEXANE-
CARBOXYLATE POLYMERS
David P. Sheetz, Midland, Mich., assignor to The Dow
Chemical Company, Midland, Mich.
No Drawing. Filed Sept. 18, 1968, Ser. No. 760,734
Int. Cl. C08f 29/38
U.S. Cl. 260—29.6 TA                    7 Claims

ABSTRACT OF THE DISCLOSURE

Latexes of vinyl cyclohexanecarboxylate polymers having excellent coating properties such as water resistance, light stability, and hardness.

BACKGROUND OF THE INVENTION

This invention relates to latexes of the vinyl cyclohexanecarboxylate polymers, especially those polymers having a vinyl cyclohexanecarboxylate moiety of at least 35 weight percent.

The use of latexes of the polyacrylates and copolymers of the alkyl acrylates and methacrylates as coating compositions is well known. Such latexes are particularly valuable in the preparation of paints and other film-forming formulations.

Equally well known are the methods for preparing these latexes, for example, emulsion polymerization wherein an aqueous emulsion of the monomeric components are polymerized in the presence of a free radical type catalyst.

In order to improve the abrasion resistance of the resultant film, it is often desirable to add a so-called hard monomer to the monomeric mixture, and thus increase the hardness of the film. These hard monomers are sometimes light and/or water sensitive, for example, polymers containing styrene monomers which are sensitive to ultra violet light often color upon exposure to sunlight. Films which are light and/or water sensitive usually do not have good weathering properties and thus do not make satisfactory exterior coatings.

SUMMARY OF THE INVENTION

It is therefore an object of this invention to provide an aqueous coating composition capable of forming a hard polymeric film having improved water resistance and light stability. Other objects and advantages of this invention will become apparent in the following specification and claims.

Accordingly, the foregoing and other objects are attained by a latex of a polymer comprising (1) from about 35 to 100 weight percent of vinyl cyclohexanecarboxylate, (2) from 0 to about 65 weight percent of an alkyl ester of an $\alpha,\beta$-ethylenically unsaturated carboxylic acid having an acid moiety of 3 to 8 carbon atoms and an alkyl moiety of 1 to 18 carbon atoms, and (3) from 0 to about 20 weight percent of an $\alpha,\beta$-ethylenically unsaturated carboxylic acid having from 3 to 8 carbon atoms, all percentages being based ont he polymer. For the purposes of this invention, the term "latex" is defined as an aqueous colloidal dispersion of the organic polymer. The latexes of this invention are readily prepared by emulsion polymerization of the corresponding monomeric components. These novel latexes are easily formulated with small amounts of thickening agents, colloidal stabilizers, antifoaming agents, preservatives, pigments, pigment extenders and plasticizers, if desired. To these latex formulations may also be added sufficient ammonium hydroxide or other water soluble base to adjust the pH of the formulation to from about 8.0 to about 9.5 in order to assure adequate shelf life in cases where the additives tend to partially acidify the formulation.

The vinyl cyclohexanecarboxylate polymers containing at least 20 weight percent of a soft monomer, e.g., an alkyl ester of acrylic acid, form clear continuous films when their latexes are dried at temperatures ranging from about 35° F. to about 70° F. Such latexes are advantageously employed in the preparation of protective coating compositions, e.g., paints and the like. It is contemplated that latexes of poly(vinyl cyclohexanecarboxylate) and latexes of copolymers of vinyl cyclohexanecarboxylate having film-forming temperatures somewhat higher than 70° F. will be utilized primarily as hardening agents in coating compositions such as floor waxes, furniture polishes and the like. Latexes of vinyl cyclohexanecarboxylate polymers containing small amounts of acid monomers are especially useful as adhesives and protective coatings where a certain amount of adhesion is desirable, for example, protective coatings for wood, plastic, metal, fiber and paper surfaces.

DESCRIPTION OF THE PREFERRED
EMBODIMENTS

Vinyl cyclohexanecarboxylate suitable for the purposes of this invention is readily prepared by transvinylation of cyclohexanecarboxylic acid with vinyl acetate, according to the method described in Aldelman, J. Org. Chem. 14, 1057 (1949). This vinyl ester may also be prepared by the methods described in U.S. Pat. 2,299,862, and British Pat. 869,829.

Alkyl esters of $\alpha,\beta$-ethylenically unsaturated carboxylic acids which may be present as comonomers in the latexes of this invention are those having from 3 to 8 carbon atoms in the acid chain and alkyl moieties of 1 to 18 carbon atoms. Typical of such esters are the copolymerizable alkyl esters of acrylic and methacrylic acid, e.g., methyl acrylate, ethyl acrylate, propyl acrylate, isopropyl acrylate, N-butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, n-amyl methacrylate, isoamyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate or methacrylate or other alkoxyethyl acrylates or methacrylates, methyl methacrylate, ethyl methacrylate, propyl methacrylate, isopropyl methacrylate, butyl methacrylate, isobutyl methacrylate, sec-butyl methacrylate, tert-amyl methacrylate, cyclohexyl acrylate, cyclohexyl methacrylate, tert-butyl acrylate, and tert-amyl acrylate. Also included are the copolymerizable alkyl esters of itaconic, citraconic, fumaric, maleic acids and the like, e.g., ethyl itaconate, methyl fumarate, propyl maleate, cyclohexyl citraconate, etc. Preferred among these esters are the alkyl acrylates and methacrylates, especially ethyl acrylate and n-butyl acrylate.

Exemplary of $\alpha,\beta$-ethylenically unsaturated carboxylic acids which may also be present as comonomers are acids having from 3 to 8 carbon atoms such as acrylic, methacrylic, itaconic, citraconic, fumaric, maleic and the like, with the preferred being acrylic and methacrylic. It is often desirable to charge the total monomer mixture with a small amount of one of these acid monomers in order to enhance colloidal stability of the resultant latex particles and improve the adhesive properties of the polymer.

Other monomers which are copolymerizable with the monomers from the above-listed types of monomers may also be present, usually in concentrations up to about 20 weight percent based on the particular polymer. Exemplary of such monomers are the monovinylidene aromatics, e.g., styrene, α-methylstyrene, vinyltoluene, vinylxylene, i sopropylstyrene, t-butylstyreen, and ethylvinylbenzene; the α-olefins and diolefins, e.g., ethylene, propylene, butene-1, hexene-1, 1,3-butadiene, and isoprene; and other vinyl compounds, e.g., acrylonitrile, methacrylonitrile, vinyl acetate, vinyl propionate, vinyl chloride, and vinylidene chloride. It should be noted that the presence of these monomers is optional and not a requirement of the invention.

Polymers particularly contemplated for use in the novel latexes of this invention include:

(1) Homopolymers of vinyl cyclohexanecarboxylate.

(2) Copolymers comprising upwards from about 35 weight percent of vinyl cyclohexanecarboxylate and up to about 65 weight percent of an alkyl ester, as hereinbefore described.

(3) Copolymers comprising upwards from about 35 weight percent of vinyl cyclohexanecarboxylate and up to about 20 weight percent of an unsaturated carboxylic acid, as hereinbefore described.

(4) Copolymers comprising upwards from about 35 weight percent of vinyl cyclohexanecarboxylate, up to about 65 weight percent of the alkyl ester and up to about 20 weight percent of the unsaturated carboxylic acid.

In copolymers which additionally contain at least one suitable unsaturated carboxylic acid, it is contemplated that the carboxylic acid may be in the form of the free acid or a salt thereof. Such salts are readily formed by neutralization of the free acid with base such as ammonium hydroxide, potassium hydroxide, sodium hydroxide and the like.

The novel latexes of the present invention comprise polymers of from about 35 to 100 weight percent of vinyl cyclohexanecarboxylate, from 0 to about 65 weight percent of an alkyl ester as previously described, and/or from 0 to about 20 weight percent of an unsaturated carboxylic acid also as previously described, particularly polymers selected from the previously discussed groups of polymers. While latexes of the homopolymers of vinyl cyclohexanecarboxylate are a part of this invention and are very useful as hardening agents in other coating compositions such as floor waxes and the like, films of the homopolymers are somewhat brittle and do not adhere well to most surfaces. Also latexes of the homopolymers have relatively high film-forming temperatures, thus are not easily converted to clear, continuous films. To improve adhesion of the resulting polymers, it is often desirable to charge the monomer mix with up to about 20 weight percent of one or more of the specified acid monomers, preferably from about 1.2 to about 2.0 weight percent based on the polymer. The presence of a number of acid groups in the polymer, especially when a substantial number of these groups reside on the surfaces of the latex particles and are converted to the anionic form by neu-neutralization of the acid groups with base, enhances stability of the latex considerably. However, large amounts, i.e., greater than about 20 weight percent, of the acid comonomer increase the water sensitivity of the polymer, and therefore should be avoided in preparing most coating compositions where the coatings are intended to be water-resistant. To increase flexibilities or elongation of the resultant polymeric film and to lower the film-forming temperature of the polymer, it is often desirable to add a soft monomer to the monomer mix, for example, the alkyl esters of acrylic acid. For the purposes of this invention the term "soft monomer" is defined as a monomer which, when copolymerized with monomers that typically polymerize to form hard, somewhat brittle polymers having relatively high softening points, impart flexiblility, toughness, and lower softening temperatures to the resulting polymer. The soft monomers may be added advantageously in amounts up to about 65 weight percent, preferably in amounts from about 40 to about 55 weight percent. At concentrations of the soft monomer greater than 65 weight percent, the hardness of the resulting film is reduced below that which is desirable in many coating compositions.

The vinyl cyclohexanecarboxylate polymers in latex form having solids concentration from about 30 to about 65 weight percent polymer solids may be prepared directly by emulsion polymerization or indirectly by a two step process wherein the monomers are polymerized in a bulk process and the resulting solid polymer is dispersed in an aqueous medium by known techniques. For the sake of convenience, it is usually preferable to prepare latex of the polymer directly by emulsion polymerization wherein the monomers are dispersed in an aqueous medium containing a free radical type catalyst and a stabilizing emulsifier or mixture of emulsifiers.

Suitable free radical catalysts include the persulfates (including ammonium, sodium and potassium persulfate), hydrogen peroxide, the perborates, and the percarbonates. Organic peroxides may also be used either alone or in addition to an inorganic peroxygen compound. Typical organic peroxides include benzoyl peroxide, tert-butyl hydroperoxide, cumene peroxide, acetyl peroxide, caproyl peroxide, tert-butyl perbenzoate, tert-butyl diperphthalate, methyl ethyl ketone peroxide and the like. The usual amount of catalyst required is roughly from about 0.01 to about 3.0 weight percent, based on the monomer mix. In order to enhance rate of polymerization, improve polymer properties, and to reduce undesirable side reactions, it is often desirable to activate the catalyst. Activation of the catalyst also has the effect of lowering the temperature required to polymerize the monomers. The activation may be best accomplished by using a redox system in which a reducing agent within the limits of about 0.001 to about 6.0 weight percent based on the monomers is present in addition to the peroxide catalyst. Many examples of such redox systems are known. Agents such as hydrazine or a soluble oxidizable sulfoxy compound, including the alkali metal salts of hydrosulfites, sulfoxalates, thiosulfates, sulfites and bisulfites and the like can be employed. Redox systems may be activated by the presence of a small amount (a few parts per million) of polyvalent metal ions. Ferrous ions are commonly and effectively used, or a tertiary amine which soluble in the reaction medium may also be used as an activator.

Stabilizing emulsifiers suited for the purposes of this invention include the anionic and non-ionic surfactants. Examples of suitable anionic surfactants include the alkyl aryl sulfonates, the alkali metal alkyl sulfates, the sulfonated alkyl esters, the fatty acid soaps, and the like. Specific examples of these well-known emulsifiers, for the purpose of illustration and not for limitation, are sodium butylnaphthalene sulfonate, sodium lauryl sulfate, disodium dodecyldiphenyl ether disulfonate, N-octadecyl disodium sulfosuccinamate, dihexyl sodium sulfosuccinate and dioctyl sodium sulfosuccinate. A preferred anionic surfactant is disodium dodecyldiphenyl ether disulfonate.

Suitable non-ionic surfactants include the polyethenoxy agents, e.g. ethylene glycol polyethers, ethylene nonylphenol polyethers, and the like; fatty acid esters of polyhydric alcohols, e.g., propylene glycol fatty acid ester; and the like. Other suitable non-ionic emulsifiers are described in Becher, Emulsions: Theory and Practice, 2d.

ed., Reinhold Publishing Corporation, New York, 221–225 (1965). A preferred non-ionic emulsifiers is ethylene nonylphenol polyether having 40 moles of ethylene oxide per mole of nonylphenol.

The amounts of surfactants required depend primarily on the concentrations of monomers to be handled and, to a further extent, with the choice of kind of surfactants, monomers, and proportions of monomers. Generally, the amount of emulsifying agent required falls between about 0.5 and about 10 weight percent of the mixture of monomers. A preferable emulsifier system for preparing the latexes of this invention is a mixture of from about 0.1 part to about 0.5 part of an anionic surfactant and from about 4 parts to about 5 parts of a non-ionic surfactant per 100 parts monomers used in the preparation of the latex. Latexes which do not have a measurable amount of coagulum are readily obtained when the amount is from about 0.2 to about 0.3 part of anionic surfactant and from about 4.0 parts to about 4.2 parts of non-ionic surfactant per 100 parts of monomer.

Polymerization of the monomers is suitably carried out at temperatures between about room temperature and about 100° C., preferably between about 65° and about 80° C. As mentioned previously the use of catalyst activators lowers the required temperature of polymerization. During polymerization the temperature may be controlled in part by the rate at which the monomers are supplied and interpolymerized and/or by applied cooling.

As taught in the art, emulsion polymerization may be performed batchwise or continuously. It is possible to work entirely batchwise, emulsifying the entire charge of monomers and proceeding with polymerization. It is usually advantageous, however, to start with part of the monomers which are to be used and add the remainder of the monomer or monomers as polymerization proceeds. An advantage of gradual monomer addition lies in reaching a high solids content with optimum control and with maximum uniformity of product.

In a preferred embodiment, the emulsion polymerization process for preparing the latexes of the present invention commences with the addition of the anionic surfactant to the aqueous reaction vehicle in a suitably equipped reaction vessel. This is followed by the addition of a portion of the monomeric components to the reaction vessel while purging the reaction atmosphere with an inert gas, such as nitrogen or helium and heating the resulting mixture to a predetermined temperature. At this point the free radical catalyst is introduced into the reaction medium followed by the gradual addition of the remaining portion of monomers over a substantial period, usually more than 3 hours. Approximately one hour after the gradual addition of the monomer is begun, an aqueous solution of the non-ionic surfactant is gradually introduced into the reaction medium over a predetermined period, usually 3 to 4 hours. After the addition of the remaining portion of monomers, the reaction is digested at or slightly above the predetermined temperature until the content of dispersed polymer reaches from about 30 weight percent to about 65 weight percent of the total dispersion, preferably from about 40 percent to about 55 percent. It is desirable to continue the digestion stage until no more than a few percent of monomers remain in the mixture. This can frequently be achieved in approximately 2 to 3 hours after the gradual addition of monomers is completed. It should be noted that the digestion stage is an uninterrupted reaction period in which the reaction conditions are not upset by the addition of more ingredients. The digestion stage usually assists the attainment of the desired polymer latex in good yield.

Agitation usually is required to form the dispersion initially and to maintain the dispersion throughout polymerization. The rate of agitation to be used in any particular instance will be dependent primarily on the overall design of the polymerization equipment. Near the minimum amount of agitation required to form and to maintain the dispersion is usually to be preferred, although the precise rate is not critical.

Before cooling the latex, it is desirable to remove any unreacted monomers by a stripping means such as steam distilling or other conventional means. Also it may be desirable to concentrate the resulting latex by removing a portion of the water by evaporation or the like.

The following examples are given to illustrate more clearly the principle and practice of this invention to those skilled in the art and are not for the purposes of limitation. All parts and percentages are by weight unless otherwise indicated.

EXAMPLE 1

A mixture of an aqueous layer consisting of 1000 grams of water and 2.0 grams of disodium dodecyldiphenylether disulfonate and oil layer consisting of 42.7 grams of vinyl cyclohexanecarboxylate and 57.3 grams of ethyl acrylate are placed in a 5-liter, 3-necked round bottom flask fitted with a reflux condenser, dropping funnels, stirrer, temperature controller, and infrared lamp heater. The mixture is stirred and heated to 70° C. and the reaction vessel is purged with nitrogen whereupon 5 grams of potassium persulfate is introduced into the mixture. Fifteen minutes after the addition of the catalyst, the remaining monomeric portion consisting of 377.3 grams of vinyl cyclohexanecarboxylate, 507.7 grams of ethyl acrylate, and 15.0 grams of acrylic acid is gradually added to the reaction mixture through a dropping funnel at a uniform rate over a 5 hour period. After one hour, an aqueous solution of 50 grams of ethylene nonylphenol ether having 40 moles of ethylene oxide per mole of nonylphenol ether and 400 grams of water is gradually introduced into the system at a rate such that the entire solution is added over a 3 to 4 hour period. After the monomer addition is complete, the mixture is digested at 70° C. for an additional two hours to complete polymerization. The resulting latex is steam distilled to remove residual monomer and concentrated by removal of water under vacuum to polymer solids content of 50.2 percent. The final stable latex has pH of 1.6 and surface tension of 46.5 dynes per centimeter.

EXAMPLES 2–4

Using the procedure described in Example 1 except that the latexes are not steam stripped or concentrated, latexes are prepared with varying proportions of ethyl acrylate (EA) and vinyl cyclohexanecarboxylate (VCC) with a constant 1.5 percent of acrylic acid (AA) based on total monomer. The following Table I lists the composition of the monomer charge and the final polymer solids content and the average particle diameter of the resulting latex. The minimum film-forming temperature and adhesion are shown in Table III for comparison purposes.

TABLE I

| | Monomer charge, percent | | | Latex product | |
|---|---|---|---|---|---|
| | EA | VCC | AA | Percent solids | Particle diameter, A.[1] |
| Example: | | | | | |
| 2 | 63.5 | 35.0 | 1.5 | 41.6 | 1,070 |
| 3 | 48.5 | 50.0 | 1.5 | 40.9 | 1,110 |
| 4 | 33.5 | 65.0 | 1.5 | 41.3 | 1,100 |

[1] Particle diameters are measured by light scattering using a Lumetron Colormeter (Model 402–E) and a plot of particle diameter versus percent transmission for an 80/20 methyl methacrylate/2-ethylhexyl acrylate copolymer.

EXAMPLES 5-8

Following the procedure of Example 1, except eliminating the steam distillation and concentration of the latex, a series of latexes is prepared with varying ratios of n-butyl acrylate (BA/vinyl cyclohexanecarboxylate (VCC), with a constant 1.5% acrylic acid (AA) based on total monomer. The following Table II lists the monomer composition and the solids content and particle diameter of the resulting latex. The resulting properties of films formed from these latexes are shown in Table III which follows Example 9.

TABLE II

| | Monomer charge, percent | | | Latex product | |
|---|---|---|---|---|---|
| | BA | VCC | AA | Percent solids | Particle diameter, A.[1] |
| Example: | | | | | |
| 5 | 63.5 | 35.0 | 1.5 | 39.6 | 980 |
| 6 | 48.5 | 50.0 | 1.5 | 41.6 | 1,240 |
| 7 | 33.5 | 65.0 | 1.5 | 42.2 | 1,220 |
| 8 | 18.5 | 80.0 | 1.5 | 42.5 | 1,840 |

[1] Particle diameters are determined according to method described in Examples 2-4.

EXAMPLE 9

A homopolymer latex of vinyl cyclohexanecarboxylate (VCC) is prepared by the procedure described in Example 1, except the steam stripping and concentration of the latex is omitted. The VCC monomer is used in a concentration equal to the combined monomers in Example 1.

The resulting stable latex has a solids content of 41.77% and a particle diameter greater than 2000 A. The resulting properties of films formed from this latex and the latexes of Examples 2-8 are shown in the following Table III for the purposes of comparison. The degree of hardness corresponds to the minimum film-forming temperatures with the higher temeprature indicating a harder film will be formed.

TABLE III

| | Minimum film-forming temp., °F.[1] | Adhesion[2] |
|---|---|---|
| Latex example No.: | | |
| 2 | 39 | Fiber tear. |
| 3 | 56 | Do. |
| 4 | 70 | Poor bond. |
| 5 | 39 | Fiber tear. |
| 6 | 39 | Do. |
| 7 | 56 | Poor bond. |
| 8 | 70 | No adhesion. |
| 9 | >72 | Do. |

[1] Minimum film-forming temperature is minimum temperature at which a latex of the polymer forms a continuous clear film on drying. Film-forming temperature is a measure of hardness often used by the coating art with the higher film-forming temperatures corresponding to the harder film. As a guide for comparison, a latex of a copolymer of 30 percent methyl methacrylate, 68 percent ethyl acrylate and 2 percent acrylic acid, by weight, is film-forming at 42°-43° F. Such a copolymer is considered as a copolymer having acceptable hardness by those skilled in the coating art.

[2] Adhesive properties: A rectangular piece of cardboard–4 in. x 6 in.– is spread with the latex to be tested leaving an 1½ in. margin at each end. A piece of 0.002 in. thick aluminum foil of the same size is pressed firmly on the cardboard. This composite is placed in an oven at 215° C., for five minutes. After cooling to room temperature, laminate is pulled apart by hand and the nature of the adhesive bond noted.

EXAMPLE 10

A latex of a terpolymer of 56.5 percent ethyl acrylate, 42.0 percent vinyl cyclohexanecarboxylate, and 1.5 percent acrylic acid is prepared according to the procedure of Example 1. An exterior paint composition is prepared from the latex in the following formulation:

| | Parts |
|---|---|
| First portion: | |
| Water | 22.0 |
| Tamol 731 (25 percent)[1] | 0.7 |
| Titanium dioxide, rutile | 18.0 |
| Water ground mica, 325 mesh | 3.0 |
| Calcium carbonate | 10.0 |
| ASP-400 clay | 4.5 |
| Ethylene glycol | 1.5 ⎫ |
| Polypropylene glycol (mol. wt. 1,200) | 0.2 ⎬ Preblended. |
| Methyl cellulose, 4,000 cps | 0.4 ⎭ |
| Second portion: | |
| Latex (adjusted to 47 percent solids) | 49.0 |
| Antifoam agent [2] | 1.0 ⎫ |
| Phenyl mercurial preservative | 0.6 ⎬ Do. |
| Alkanolamine condensate | 0.8 ⎭ |

[1] The sodium salt of diisobutylene/maleic anhydride copolymer.
[2] Predominantly a salt of sulfated fatty acid at 60 percent solids concentration.

The paint formulation is applied to a dry surface and allowed to harden. The resultant film showed only a trace of tack and slight stiffening after 500 hours in an Atlas Fadeometer operated at 125° F.

What is claimed is:

1. A latex of a polymer consisting essentially of (1) from about 35 to about 65 weight percent of vinyl cyclohexanecarboxylate, (2) from about 35 to about 65 weight percent of an alkyl ester of an α,β-ethylenically unsaturated carboxylic acid having an acid moiety of 3 to 8 carbon atoms and an alkyl moiety of 1 to 18 carbon atoms, and (3) from about 1.2 to about 20 weight percent of an α,β-ethylenically unsaturated carboxylic acid having from 3 to 8 carbon atoms, said latex having a solids concentration of from about 30 to about 65 weight percent polymer solids.

2. The latex according to claim 1 wherein the polymer consisting essentially of (1) from about 35 to about 50 weight percent of vinyl cyclohexanecarboxylate, (2) from about 48 to about 63.8 weight percent of the alkyl ester of claim 1 and (3) from about 1.2 to about 2 weight percent of the carboxylic acid of claim 1.

3. The latex according to claim 1 wherein the alkyl ester is n-butyl acrylate.

4. The latex according to claim 1 wherein the alkyl ester is ethyl acrylate.

5. The latex according to claim 1 wherein the carboxylic acid is acrylic acid.

6. A latex of a polymer consisting essentially of (1) from about 35 to about 65 weight percent of vinyl cyclohexanecarboxylate, and the remainder of the polymer being selected from at least one monomer from (2) or a mixture from (2) and (3), (2) from 0 to about 65 weight percent of an alkyl ester selected from the group consisting of methyl acrylate, ethyl acrylate, propyl acrylate, isopropyl acrylate, n-butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, n-amyl methacrylate, isoamyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate or methacrylate, isopropyl methacrylate, butyl methacrylate, isobutyl methacrylate, sec-butyl methacrylate, tert-amyl methacrylate, cyclohexyl acrylate, cyclohexyl methacrylate, tert-butyl acrylate, tert-amyl acrylate, ethyl itaconate, methyl fumarate, propyl maleate, and cyclohexyl citraconate, and (3) from 0 to about 20 weight percent of an α,β-ethylenically unsaturated carboxylic acid selected from the group consisting of acrylic acid, methacrylic acid, itaconic acid, citraconic acid, and fumaric acid and maleic acid, said latex having a solids concentration of from about 30 to about 65 weight percent polymer solids.

7. A latex of a polymer consisting essentially of (1) from about 35 to about 80 weight percent of vinyl cyclohexane carboxylic acid, (2) from about 18.5 to about 63.5 weight percent of n-butyl acrylate, and (3) about 1.5 weight percent of acrylic acid, said latex having a solids concentration of from about 30 to about 65 weight percent polymer solids.

References Cited
UNITED STATES PATENTS

| | | | |
|---|---|---|---|
| 2,751,364 | 6/1956 | Whitstone et al. | 260—468 X |
| 3,320,198 | 5/1967 | Hill | 260—29.6 TA |
| 3,458,466 | 7/1969 | Lee | 260—29.6 TA |
| 3,492,341 | 1/1970 | Trevillyan | 260—468 X |

JULIUS FROME, Primary Examiner

J. B. LOWE, Assistant Examiner

U.S. Cl. X.R.

260—29.6 H, 89.1